United States Patent
Button

(10) Patent No.: US 10,136,579 B2
(45) Date of Patent: Nov. 27, 2018

(54) MOWER FOR ATTACHMENT TO AN AGRICULTURAL VEHICLE

(71) Applicants: David D. Button, Great Bend, KS (US); Barbara J. Button, Great Bend, KS (US)

(72) Inventor: David D. Button, Great Bend, KS (US)

(73) Assignees: David D. Button, Great Bend, KS (US); Barbara J. Button, Great Bend, KS (US)

( * ) Notice: Subject to any disclaimer, the term of this patent is extended or adjusted under 35 U.S.C. 154(b) by 22 days.

(21) Appl. No.: 15/411,214

(22) Filed: Jan. 20, 2017

(65) Prior Publication Data

US 2017/0127614 A1 May 11, 2017

(51) Int. Cl.
| | |
|---|---|
| *A01D 34/00* | (2006.01) |
| *A01D 69/00* | (2006.01) |
| *A01D 43/14* | (2006.01) |
| *A01B 59/043* | (2006.01) |
| *A01D 43/08* | (2006.01) |

(52) U.S. Cl.
CPC ............ *A01D 43/14* (2013.01); *A01B 59/043* (2013.01); *A01D 34/005* (2013.01); *A01D 43/08* (2013.01); *A01D 43/088* (2013.01)

(58) Field of Classification Search
CPC ........ A01D 69/00; A01D 69/02; A01D 67/00; A01D 75/30; A01D 75/306; A01D 34/44; A01D 34/62; A01D 34/64; A01D 34/661; A01D 43/14; A01D 34/005; A01D 43/08; A01D 43/088; A01B 59/043

USPC ................ 56/6, 7, 11.9, 15.9; 172/313, 314; 280/411.1
See application file for complete search history.

(56) References Cited

U.S. PATENT DOCUMENTS

| | | | |
|---|---|---|---|
| 2,952,961 A | 9/1960 | Engler | |
| 2,986,864 A | 6/1961 | Young | |
| 3,115,738 A | 12/1963 | Engler | |
| 3,264,807 A | 8/1966 | Wallace | |
| 3,400,521 A | 9/1968 | Caldwell | |
| 3,550,360 A | 12/1970 | Van Der Lely | |
| 3,650,096 A | 3/1972 | Caldwell | |
| 4,330,981 A * | 5/1982 | Hall ....................... | A01D 75/30 56/7 |
| 4,601,162 A | 7/1986 | Wessel | |
| 4,858,417 A | 8/1989 | Priefert et al. | |

(Continued)

FOREIGN PATENT DOCUMENTS

| | | |
|---|---|---|
| EP | 1190616 | 3/2002 |
| JP | H0698614 | 9/1992 |

*Primary Examiner* — Robert E Pezzuto
(74) *Attorney, Agent, or Firm* — Davis & Jack, L.L.C.; Kenneth H. Jack

(57) ABSTRACT

A mower for attachment to an agricultural vehicle, the mower incorporating an "E" bracket including a column, a lower arm, an upper arm, and a medial arm, wherein each of the "E" bracket's arms has a proximal end fixedly attached to the column, and wherein each of the "E" bracket's arms is adapted for plant cutting; the mower further incorporating hitch arms for mounting the "E" bracket upon the rear end or front end of the agricultural vehicle; wherein each "E" bracket arm includes a downwardly opening housing within which a plurality of motor driven rotary blades are operatively mounted.

16 Claims, 5 Drawing Sheets

(56) References Cited

U.S. PATENT DOCUMENTS

| | | | |
|---|---|---|---|
| 5,042,236 A * | 8/1991 | Lamusga | A01D 75/30 |
| | | | 56/12.7 |
| 5,133,174 A | 7/1992 | Parsons, Jr. | |
| 5,297,378 A * | 3/1994 | Smith | A01D 67/00 |
| | | | 56/11.9 |
| 5,404,695 A | 4/1995 | Gemelli | |
| 5,435,118 A | 7/1995 | Cobile | |
| RE37,267 E | 7/2001 | Mosby | |
| 6,336,311 B1 | 1/2002 | Bednar | |
| 6,336,312 B1 | 1/2002 | Bednar et al. | |
| 6,381,934 B2 | 5/2002 | Heard | |
| 7,347,036 B1 * | 3/2008 | Easley, Jr. | A01D 75/30 |
| | | | 172/313 |
| 8,109,069 B2 | 2/2012 | Moe et al. | |
| 2004/0148917 A1 * | 8/2004 | Eastwood | A01D 75/306 |
| | | | 56/6 |
| 2008/0127619 A1 * | 6/2008 | Link | A01D 75/30 |
| | | | 56/6 |
| 2014/0216830 A1 | 8/2014 | Henson | |

* cited by examiner

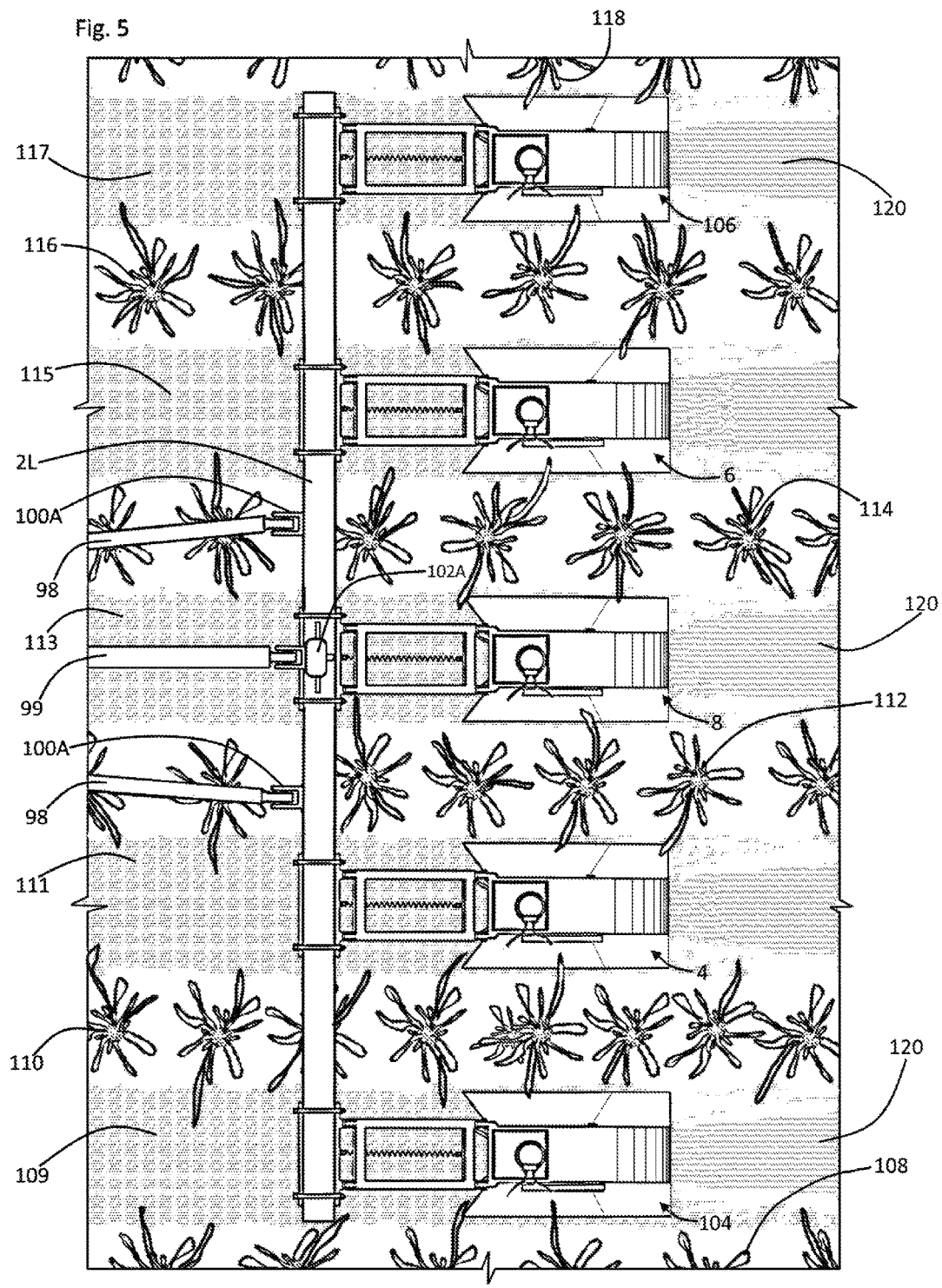

MOWER FOR ATTACHMENT TO AN AGRICULTURAL VEHICLE

FIELD OF THE INVENTION

This invention relates to agricultural mowing machines. More particularly, this invention relates to such machines which are adapted for attachment to and operation upon self propelled agricultural vehicles such as tractors and powered vehicle portions of self propelled agricultural sprayers.

BACKGROUND OF THE INVENTION

Historic advancements in agricultural weed control methods, and resultant negative effects of weeds' tendency to adapt over time to and render ineffective some of such advancements, has lead to a need for the instant invention. The purpose of the instant invention is to further control weeds and reduce weed seed populations.

In the 1970s, glyphosate herbicide (commonly sold under the trademark "Roundup") quickly became a commonly applied herbicide for use in most agricultural applications. Advancements in crop seed genetic sciences in the 1980's led to the introduction of genetically modified seeds (corn seed, soybean, and others) which were classed as "Roundup Ready", and which provided farmers access to utilization of inexpensive and effective herbicides. The "Roundup Ready" seeds gave rise to a practice of spraying glyphosate over a field to effectively kill weeds growing between the rows while leaving the planted crop unaffected. Subsequent years' advances in crop seed genetics introduced new herbicide/seed genetic combinations which enabled the utilization of different herbicides with different modes of action in killing an assortment of weeds while leaving growing crops uninjured.

During the 1970s time period, 'No-till' farming methods were developed and were popularly used in conjunction with the advances in herbicide/seed genetic systems. Herbicides were sprayed on fields to keep weeds to a minimum and 'herbicide resistant' crops were planted directly into untilled soils. Such practices greatly reduced labor and machinery costs and, in comparison with traditional tillage methods, significantly reduced soil erosion and enhanced soil moisture retention.

A major drawback or deficiency of prior art weed control systems and methods of the types discussed above is their inability to compensate for weeds' natural tendency to quickly build up a total resistance to glyphosate and other herbicide/seed systems. Herbicide resistance which has been acquired over years by numerous weed species has been so severe and widespread that agricultural chemical and seed companies have been forced to continue their attempts to develop new herbicide/crop seed systems. However, no truly new herbicide has been brought to market since 1987, with new developments being limited to re-formulations and re-combinations of existing herbicides. Crop scientists generally agree that weed species' natural adaptations in the nature of acquired chemical resistance will render any new herbicide/seed system ineffective over time.

The instant invention offers a tool that will allow farmers to reduce their dependence on ineffective herbicides. The tool may take advantage of relatively recent developments in the agricultural industry such as GPS/Autosteer systems which utilize Real Time Kinematic signal correction technology. Such advancements have given farmers the ability to follow GPS signals to travel repeated pathways across a field with lateral path variations limited to inches or less. Travel path precision (for prevention of lateral damaging impingements of the instant invention's weed mowing arms) is typically needed in operation of the instant inventive tool, and GPS guided passes of a self propelled farm vehicle pulling or driving the instant inventive tool may advantageously provide the needed travel path precision.

The inventive tool is capable of accurately, precisely and repeatedly mowing and shredding a majority of the herbicide resistant weeds that might grow between the planted rows of crops. Use of the invention also performs beneficial functions of no till farming practices including prevention of soil erosion and promotion of moisture savings, without resort to tillage. The bulk of weed residues that would, absent the use of the instant inventive mower, simply pass through crop harvesting equipment are also greatly reduced by the instant invention, advantageously minimizing harvesting equipment wear and fuel costs. Organic farmers may also significantly benefit from by use of the inventive tool to keep fields weed free without using "Organic Produce" status disqualifying chemicals.

BRIEF SUMMARY OF THE INVENTION

The instant inventive mower is intended for attachment to and use upon a self propelled agricultural vehicle. In a typical and suitable embodiment, the mower attaches to the rear of an agricultural tractor, such attachment typically comprising a three point hitch. Alternatively, other types of self propelled agricultural vehicles such as the wheeled vehicle portion of a self propelled agricultural sprayer may be utilized. Where such sprayer agricultural vehicle is utilized, the inventive mower may be advantageously attached at a forward or rearward position as an alternative to, and in the same manner as, such vehicle's laterally and oppositely laterally cantilevering sprayer rig.

A major structural component of the instant inventive mower comprises an "E" bracket which incorporates a substantially horizontal and laterally extending column. In a preferred embodiment, such column may comprise a rigid and durable length of steel square tubing.

Similarly with the structure of a common capital letter "E", the "E" bracket component of the instant invention includes a lower arm, an upper arm, and at least a first medial arm situated between the lower and upper arms. Each of the instant invention's "E" bracket arms has proximal and distal ends, and each such arm's proximal end is necessarily fixedly attached to the "E" bracket's column component. Each "E" bracket arm is also necessarily adapted for progressive rotary blade weed cutting along the unplanted corridors between parallel crop rows.

Further structural components of the instant inventive mower comprise means for mounting the "E" bracket's column upon the self propelled agricultural vehicle. Where the inventive mower is to be attached at the rear of conventional agricultural tractor, a three point hitch including left, right, and central pivot arms may be suitably utilized as the instant invention's mounting means. Suitably, such mounting means may comprise pin and clevis joint components which are adapted for attaching distal ends of such hitch arms. Where the instant inventive mower is to be attached to and utilized upon the wheeled vehicle portion of a self propelled agricultural sprayer, the invention's mounting means may comprise such vehicle's sprayer rig mounting arms and brackets.

In a preferred embodiment, the distal end of each of the arm components of the instant invention's "E" bracket comprises a downwardly opening mower housing which supports a rotary drive motor and orbiting blades. Each of the "E" bracket's downwardly opening housings preferably has a laterally narrow configuration at its upper end, such dimensioning advantageously making the assembly's arms suitable for passage in the manner of comb tines between crop rows without damaging lateral impingements against adjacent crop rows. The lower ends of the downwardly opening housings are preferably laterally flared so that a widened span of horizontally orbiting blades may be operatively housed, and so that the "E" bracket arms may mow weeds growing beneath laterally overarching leaves of planted crops.

The proximal end of each of the "E" bracket's arms preferably comprises a pivot arm linkage which securely attaches a proximal end of one of the downwardly opening housings with the "E" bracket's column. In a preferred embodiment, the "E" bracket's proximal pivot arm linkages are longitudinally elongated to facilitate a significant upward extension and heightened elevation (with respect to tops of planted crops) of the "E" bracket's column. Such elongated housing links allow the "E" bracket's lateral column to harmlessly pass over the tops of planted crops while the "E" bracket's arms, including their distal end mowers, extend angularly downward to mow weeds growing between the crop rows.

Accordingly, objects of the instant invention include the provision of a mower for attachment to an agricultural vehicle which incorporates structures as described above, and which arranges those structures in relation to each other in manners described above, for the performance of beneficial functions described above.

Other and further objects, benefits, and advantages of the instant invention will become known to those skilled in the art upon review of the Detailed Description which follows, and upon review of the appended drawings.

BRIEF DESCRIPTION OF THE DRAWINGS

FIG. 5 presents an alternate configuration of the structure depicted in FIG. 1, the view of FIG. 5 further showing an agricultural field upon which the instant invention may be used.

DETAILED DESCRIPTION OF A PREFERRED EMBODIMENT

Figure 1:
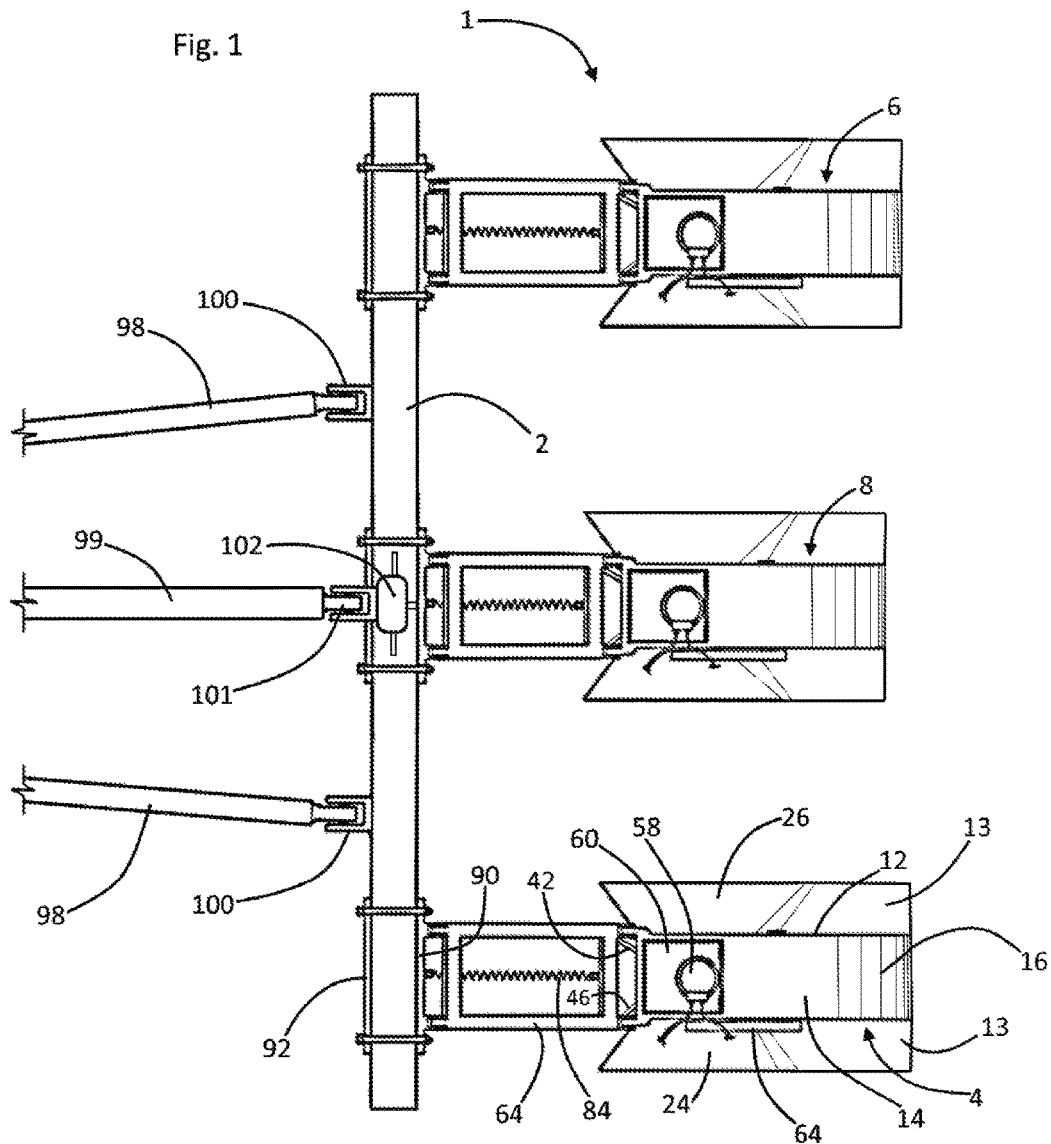
FIG. 1 is a vertical plan view of a preferred embodiment of the instant inventive mower for attachment to an agricultural vehicle.
Figure 2:
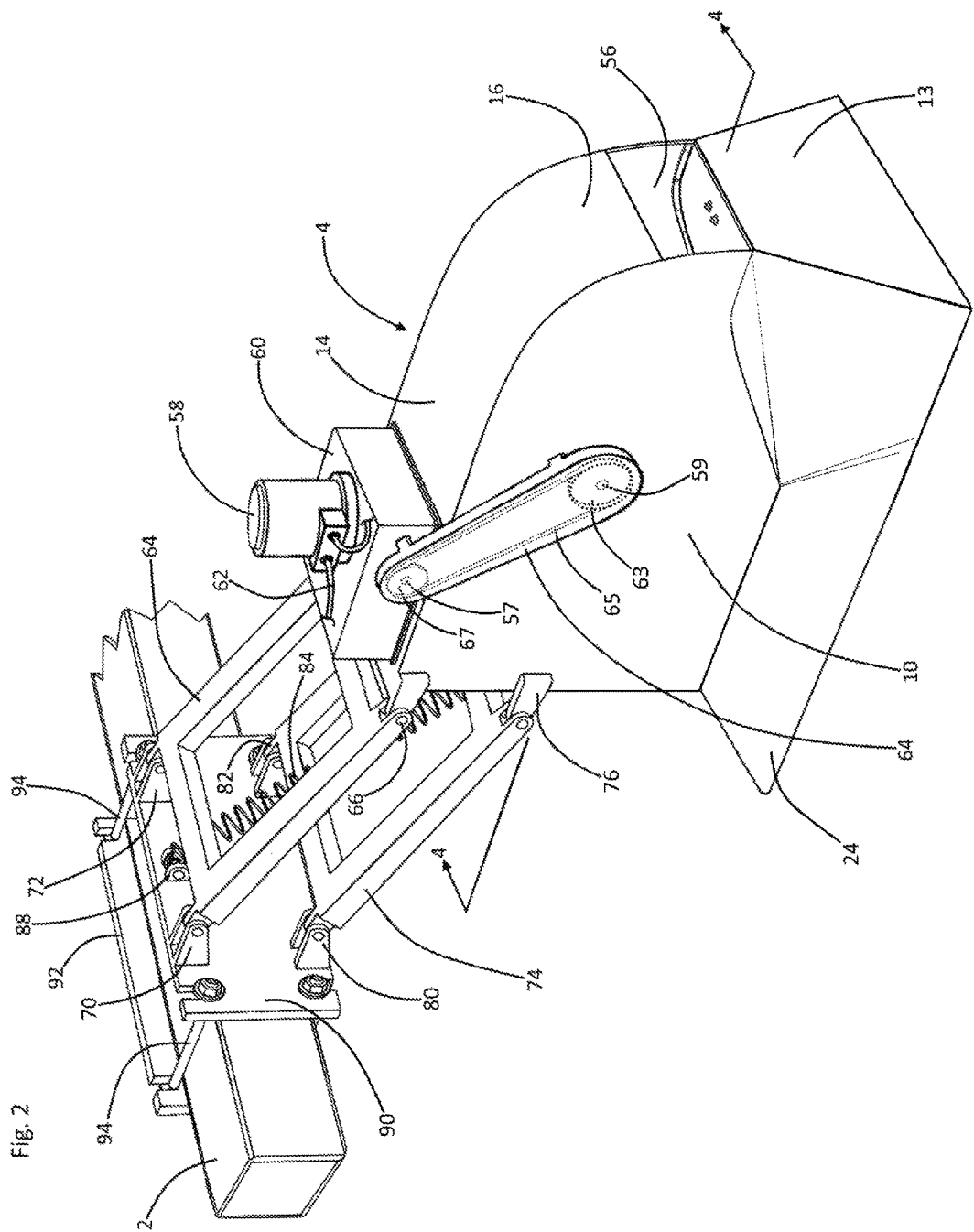
FIG. 2 is a perspective view of an "E" bracket arm component of the instant invention.

Referring now to the drawings, and in particular to Drawing FIG. 1, a preferred embodiment of the instant inventive mower for attachment to an agricultural vehicle is referred to generally by Reference Arrow 1. The mower 1 preferably comprises an "E" bracket including a column portion 2, a lower arm 4, an upper arm 6, and at least a first medial arm 8. Referring further simultaneously to FIG. 5, the instant invention's "E" bracket component may include additional arms 104 and 106, such arm additions re-characterizing FIG. 1's arms 4, 6, and 8 as the "E" bracket's medial arm. Each of the "E" bracket's arms is necessarily configured and adapted for mowing of weeds.

The instant inventive mower preferably further comprises mounting means for secure and fixed attachment of the "E" bracket to a self propelled agricultural vehicle. Where the "E" bracket component is to be towed behind a common agricultural tractor, a three point hitch including pivot arms 98 and 99 may be utilized, such arms being attached to the column 2 at clevis mounts 101 and 100. For purposes of enhancing vertical stability of the column 2, clevis mount 101 attaches at an upper end of a "T" column 102 whose base end is fixedly attached to the "E" bracket column 2. Suitably, the instant invention's mounting means may alternatively consist of halves of clevis joints 100 and 101, or other commonly known heavy duty auxiliary equipment releasable fasteners.

Referring simultaneously to FIGS. 1-4, each of the "E" bracket's arms 6 and 8 is preferably configured substantially identically with the lower arm 4. Such "E" bracket arm 4 preferably comprises a rigid and durable downwardly opening housing having a left wall 10, a right wall 12, a front wall 18, an upper wall or ceiling 14, and an arcuately curved rear wall 16. The downwardly opening housing preferably includes a sloped partial floor 22 which, in combination with the housing's left, right, front, and rear walls forms and defines a lower/front cut plant intake port 54, and an upper/rear mulch output port 56.

Figure 3:
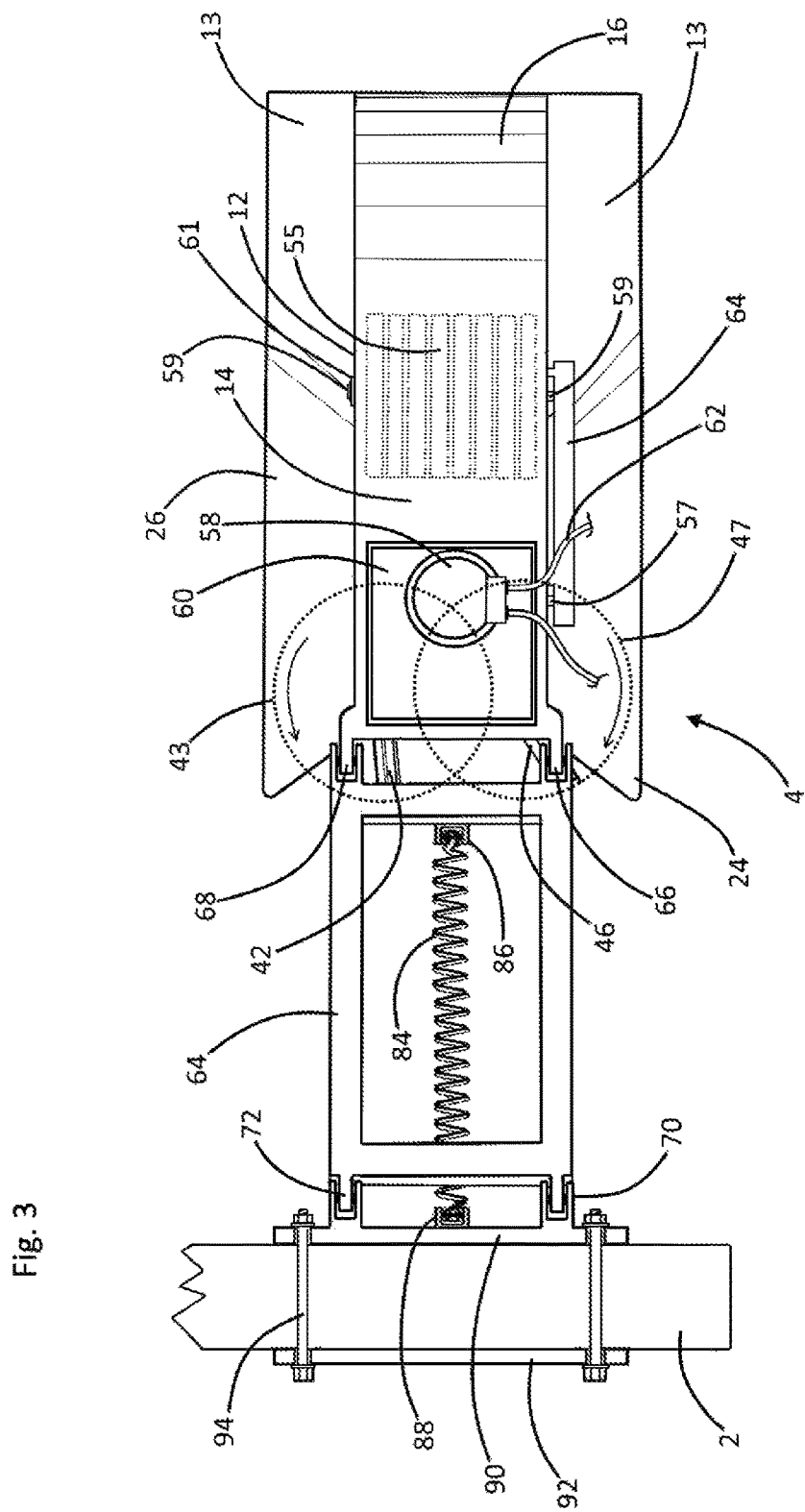
FIG. 3 is a vertical plan view of the structure depicted in FIG. 2.
Figure 4:
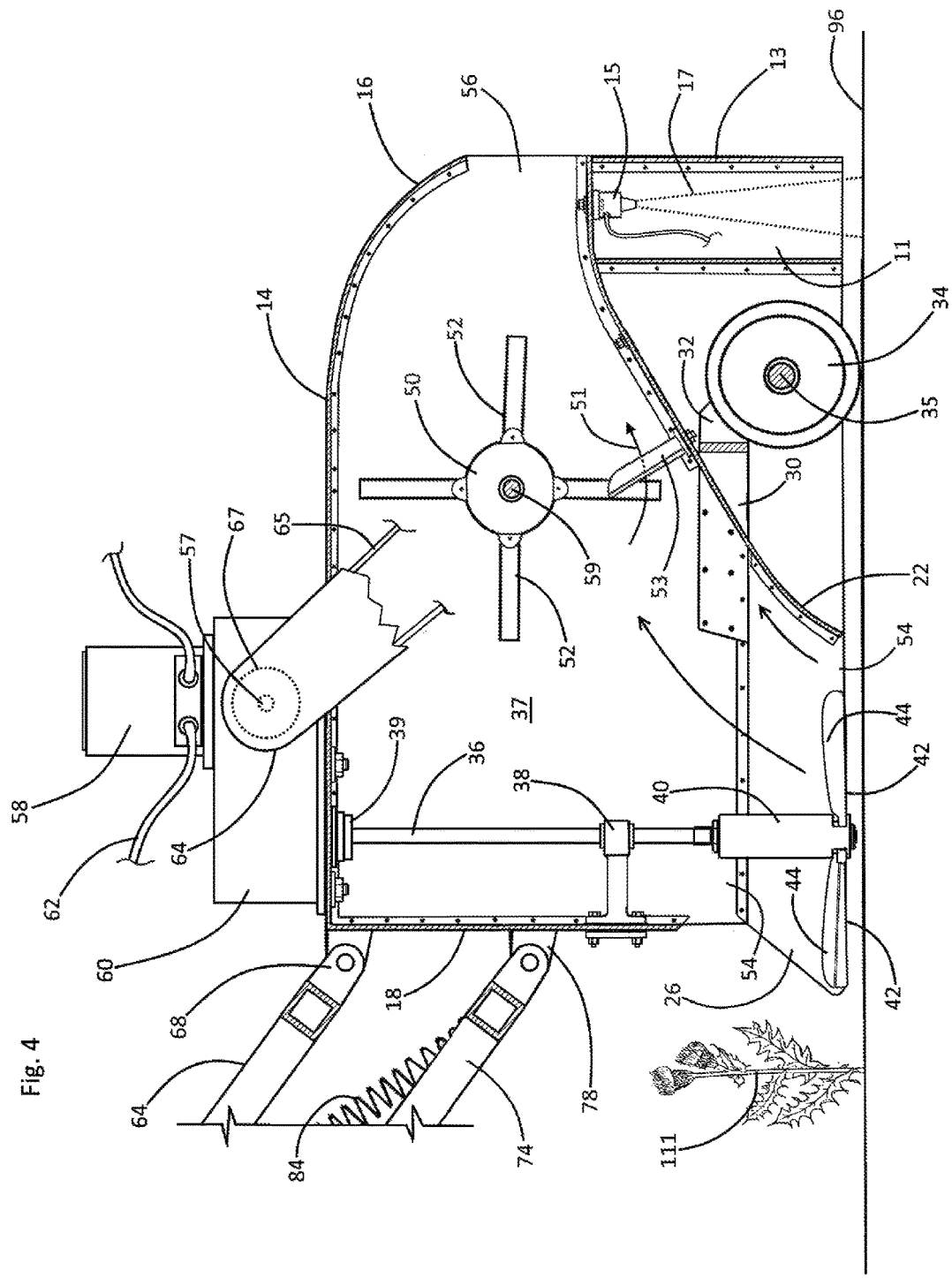
FIG. 4 is a sectional view of the structure depicted in FIG. 2, as indicated in FIG. 2.

For purposes of prevention of impinging and damaging contacts between the "E" bracket's downwardly opening housings and growing row crops, the lateral dimensions of the upper portions of the housings are preferably relatively narrow, between 8" and 20". In contrast, the lower portions of the downwardly opening housings are preferably laterally widened or flared, preferably via installations of left and right flare plates 24 and 26. As indicated in FIGS. 3 and 4, right and left or laterally paired horizontally orbiting blades 42 and 46 provide cumulative and widened cutting swaths 43 and 47 which substantially span the entire lateral width of the downwardly opening housings at their flared and widened lower ends. Accordingly, the downwardly opening housing components of the instant invention advantageously include relatively narrow upper lateral profiles for avoidance of damage to growing crops, and provide relatively wide mowing swaths for mowing weeds growing between crop rows and beneath the crops' laterally overarching leaves.

For purposes of enhanced stability and distal end support, rear wheels 34 are preferably installed upon the downwardly opening housings, such wheels being supported on brackets 30 which are rigidly installed at the lower and rearward ends of the downwardly opening housings. Left and right axle support arms 32 extend rearwardly from the brackets 30, such arms supporting lateral axles 35 which extend axially through the wheels 34. Axle support arms 32 may suitably comprise adjustable length arms for adjustment of cutting height.

The housing's right and left or laterally paired arrays of horizontally orbiting blades 42 and 46 preferably have their proximal ends pivotally mounted in the manner of sling blades to left and right central hubs 40 (the left central hub and axle assembly not being within views). The laterally paired hubs 40 are preferably driven by laterally paired axles 36 which extend downwardly through the interior spaces 37 of the downwardly opening housings. Upper rotary bearings 39 situated at the housings' ceilings 14, and underlying rotary bearings 38 which are secured to the housings' front walls 18, are preferably provided for securely positioning the blades 42 and 46 at their laterally paired positions, while restricting their movements to orbital motions.

In the preferred embodiment, the trailing edge of each of the horizontally orbiting blades 42 and 46 has an upward cant which forms an air vane or air foil 44, such vanes 44 assuring that the blades 42 and 46 dually or additionally function as air impellers. Upon rapid counter-rotation of the laterally paired blades 42 and 46, their canted trailing edge vanes 44 advantageously pull and drive air and cut plant material upwardly through the housings' lower and forward intake ports 54, and further into the upper and interior spaces of the housings. To enhance the ability of the paired blades 42 and 46 to draw cut plant material into the housings, the inward and overlapping flights of their counter-orbital paths preferably move rearwardly.

Each of the instant invention's downwardly opening housings preferably further houses and rotatably supports vertically orbiting hammer blades 52, such blades 52 being pivotally mounted to a laterally extending rotary hub 50. A lateral axle 59 extending through the hub 50 is supported by lateral axle bearings 61 upon the housings' left and right walls 10 and 12. In the preferred embodiment, such vertically orbiting blades 52 are arranged as a plurality of "X" arrays of such blades, such arrays forming a laterally extending blade battery 55, as indicated in dotted lines upon FIG. 3. The hammer blades 52 of batteries 55 pass rearwardly between a lateral series or array of stationary cutting blades 53 for effective mulching of weed cuttings. In a preferred embodiment, the hammer blades 52 and their cumulatively formed blade batteries 55 rotate so that the lower flights 51 of their orbits travel rearwardly toward the preferably rearwardly opening ejection ports 56, such battery rotations advantageously throwing mulched plant material rearwardly through ports 56.

In operation of the instant invention, as the "E" bracket's downwardly opening housings roll forwardly along a ground surface 96, weeds 111 may enter the forward ends of the housings and may be cut by the horizontally orbiting blades 42 and 46. Substantially simultaneously, updrafts of air impelled by the blades' canted trailing edge vanes 44 carries the weed cuttings upwardly into the interior spaces 37 of the downwardly opening housings. Such air motion induced travel of the cut weeds continues within the housings until the cut weeds come into contact with the hammer blades 52 of the blade batteries 55. Such rotating batteries further cut and mulch the weed materials by driving such materials against and between the lateral series of stationary cutting blades 53. The hammer blades 52 substantially simultaneously throw the mulched weed cuttings further rearwardly from the stationary blades 53 for rearward ejection through rearward ejection ports 56.

A rotary drive motor 58 is preferably fixedly mounted upon each of the invention's downwardly opening housings, such motors preferably being adapted and connected for supplying rotary power to each housings' blades 42, 46, 52, and 55. While the motor 58 of FIGS. 3 and 4 is depicted as an hydraulic motor having hydraulic fluid supply and return lines 62, such motor 58 is intended as being representative of other suitably used and suitably substituted motors such as electric motors, pneumatic motors, and internal combustion engines.

Rotary power transmission assemblies are preferably mechanically associated with the invention's motors 58 for communicating rotary power from the motors 58 at least to the invention's laterally paired axles 36 and laterally paired blades 42 and 46. Suitably, such power transmission assemblies may comprise a gear train (not depicted within views) which extends from the rotary power output of the motor 58 to meshing and counter-rotating gears (not depicted within views) mounted at the upper ends of the paired axles 36. As indicated in FIG. 4, such rotary power transmitting and communicating gear train may be housed within a sealed case 60. Alternatively, a pulleys and pulley belt assembly housed within case 60 or a sprockets and continuous loop chains assembly within case 60 may be utilized for driving the counter-rotation of the horizontally orbiting blades 42 and 46. In order to facilitate the overlapping orbits 43 and 47 of the horizontally orbiting blades 42 and 46, the power transmission assembly which rotates axles 36 preferably synchronizes such blades' counter-rotation in a manner which avoids any impinging contacts at the blades' distal ends.

The instant invention's rotary power transmission component preferably additionally communicates rotary power to the vertically orbiting hammer blades 52 and their blade batteries 55. In a suitable embodiment, such augmented power transmission assemblies may comprise meshed pairs of 45° bevel gears (not depicted within views) operatively mounted within case 60, such gears translating vertical rotary outputs of motors 58 into powered rotations of lateral axles 57. Such lateral axles 57 may emerge from the cases 60 to rotatably power pulleys 67,63 and continuous loop belts 65 combinations which are housed under shrouds 64, the lower pulleys 63 being mounted to lateral ends of the mulching blade batteries' transverse axles 59. The depicted pulleys and belt power transmission assemblies 67,65,63, are intended as being representative of other suitably substituted power transmission assemblies such as sprocket and continuous loop chain assemblies, and gear trains.

The interconnections between the "E" bracket's arms 4, 6, and 8, and the "E" bracket's column 2 preferably comprise pivoting parallel bar linkages which extend the "E" bracket's downwardly opening housings both rearwardly and substantially downwardly from the column 2, such linkages assisting in leveling of the "E" bracket's housings during mowing operations. A preferred embodiment of the pivoting parallel bar linkages comprises upper and lower pivot arms 64 and 74 wherein the rearward or distal ends of such arms are pivotally mounted to the "E" bracket's housings by pin and clevis joints 66, 68, 76, and 78, and wherein the forward or proximal ends are similarly mounted by means of pin and clevis joints 70, 72, 80, and 82. Clevis joint halves of the linkages' forward pin and clevis joints 70, 72, 80, and 82 are preferably rigidly mounted to and extend distally from rear or distal column mounting plates 90. Such plates 90, in combination with front or proximal mounting plates 92 and bolts 94, may securely mount their associated "E" bracket arms upon column 2. Loosening and re-tightening of bolts 94 advantageously allows the "E" bracket's arms to be slidably moved laterally along the "E" bracket column 2 for fixed re-positioning of the arm with respect to potentially varying crop row spacings. Triangulating springs 84 spanning between clevis mounts 86 and 88 preferably span the parallel bar linkages for lessening downwardly directed forces experienced by the "E" bracket's arms at their wheels 34 during rolling weed mowing operations.

While the parallel bar linkages 64 and 74 are depicted in the drawings as being hingedly attached to and extending forwardly with respect to the forward ends of the downwardly opening housings, such parallel bar linkages are intended as being representative of similarly configured parallel bar linkages which may alternatively attached to and extend rearwardly with respect to the rearward ends of the downwardly opening housings (such rearwardly attached and extending parallel bar linkages not being depicted within the views). In such alternative parallel bar linkage attachments, a self propelled agricultural vehicle to which the instant invention may be attached may alternatively drive or push the "E" bracket forwardly or in the direction of the distal extensions of the "E" bracket's arms.

The mounting means for securely attaching the instant inventive "E" bracket upon a self propelled agricultural vehicle (not depicted within drawings) may, as indicated in FIG. 1, suitably comprise a central bar 99 mounted by clevis joint 101 to the central vertical stabilizer column 102, in combination with lateral or left and right bars 98 mounted by clevis joints 100 to the "E" bracket's column 2. Such bars 98 and 99 may extend forwardly with respect to the front ends of the downwardly opening housings for attachment to the rear of the agricultural tractor in the manner of three point hitch. Alternatively, such bars 98,99 may extend rearwardly with respect to such housings' front ends for mounting upon, for example, the front of a motorized vehicle portion of a self propelled crop sprayer. Where the self propelled agricultural vehicle utilized in conjunction with the instant invention comprises such self propelled agricultural sprayer, such sprayer's forward or rearward crop spraying rig may be removed, and the instant invention's "E" bracket column 2 may be mounted in place of such rig.

Tube fed agricultural chemical sprayers 15 may be advantageously mounted upon each of the "E" bracket arms' downwardly opening housings. In a preferred embodiment, such sprayers 15 are mounted and situated both rearwardly from the "E" bracket's wheels 34 and forwardly from the "E" bracket's mulch ejection ports 56, such sprayer positionings advantageously allowing sprayed chemicals 17, such as herbicides, fungicides, or fertilizers, to coat the surface of the ground 96 in advance of ground accumulations of ejected mulch 120. A chemical shroud 13 which forms an enclosed downwardly opening spray shrouding space 11 is preferably provided, such shroud 13 restricting applications of chemicals to ground spaces immediately underlying the lower opening of the space 11.

Referring simultaneously to FIGS. 1 and 5, all structures in Drawing FIG. 5 which are identified by a reference numeral having the suffix "A" are configured substantially identically with similarly numbered structures appearing in Drawing FIG. 1. In the alternative configuration of FIG. 5, "E" bracket column 2L is substantially longer than FIG. 1's "E" bracket column 2, such lengthened column 2L facilitating additional installations of "E" bracket arms 104 and 106. While the "E" bracket assembly of FIG. 5 shows five "E" bracket arms 4, 6, 8, 104, and 106, for enhanced mowing of spaces between six crops rows 108, 110, 112, 114, 116, and 118, such "E" bracket column may be advantageously further lengthened for installations of several additional "E" bracket arms (not depicted within views), and for mowing spaces between multiple crop rows.

Assuming that bars 98 and 99 comprise components of a three point hitch extending from the rear of an agricultural tractor (not depicted within views), such tractor may be driven forwardly with wheels rolling in the spaces between crop rows 110 and 112, and 114 and 116. Such three point hitch 98,99 is preferably operated to hold "E" bracket column 2L at an elevation which allows for damage free passage over the tops of crop rows 110, 112, 114, and 116. To facilitate such elevation of the column 2L, the "E" bracket arms' parallel bar linkages 64 and 74 are preferably elongated sufficient to allow ground level operation of the mower units while the column 2L freely passes over the tops of the crop.

During the forward rolling motion of such tractor, the "E" bracket arms 4, 6, 8, 104, and 106, are towed leftwardly according to the view of FIG. 5 along the unplanted spaces between crop rows 108, 110, 112, 114, 116, and 118. In the events of impinging contacts of the wheels 34 with obstructions within such crop row spaces, the triangulating parallel bar linkage springs 84 assist in temporarily upwardly deflecting the arms to allow their housings and wheels to easily rollably move over such obstructions.

Motor driven operations of counter-orbiting blades 42 and 46, and of the vertically orbiting hammer blades 52 and blade batteries 55 within the downwardly opening housings advantageously allow weeds 109, 111, 113, 115, and 117 growing between the crop rows, to initially enter the forward ends of the downwardly opening housings for initial cutting by the counter-orbiting and laterally paired blades 42 and 46. Such weed cuttings are immediately impelled by the air vanes 44 of the blades 42 and 46 upwardly and rearwardly within the housings for mulching impingements with the hammer blade batteries 55 and cutting blade arrays 53, and for rearward ejections as mulch 120 through ejection ports 56. In advance of such mulch ejection, the sprayed agricultural chemicals 17 emitted from sprayers 15 advantageously coat the ground surfaces 96 between the crop rows. The mulch rows 120 which are deposited within the row spaces behind the spray applications 17 advantageously assist in moisture retention for enhancing growth of the planted crops.

While the principles of the invention have been made clear in the above illustrative embodiment, those skilled in the art may make modifications to the structure, arrangement, portions and components of the invention without departing from those principles. Accordingly, it is intended that the description and drawings be interpreted as illustrative and not in the limiting sense, and that the invention be given a scope commensurate with the appended claims.

The invention hereby claimed is:

1. A mower for attachment to an agricultural vehicle, the mower comprising:
   (a) an "E" bracket, the "E" bracket comprising a column, a lower arm, an upper arm, and at least a first medial arm, wherein each of the "E" bracket's arms has a proximal end fixedly attached to the "E" bracket's column, and wherein each of the "E" bracket's arms is adapted for plant cutting and comprises a downwardly opening housing having a forward end;
   (b) mounting means fixedly attached to the "E" bracket's column, said means being adapted for extending the "E" bracket from the agricultural vehicle;
   (c) a plurality of horizontally orbiting blades, each such blade being mounted operatively at the forward end of one of the downwardly opening housings; and
   (d) a plurality of rotary drive motors, each rotary drive motor being mounted operatively for turning one of the horizontally orbiting blades, wherein the plurality of rotary blades further comprises vertically orbiting blades, each vertically orbiting blade being positioned at the rearward end of one of the downwardly opening housings.

2. The mower of claim 1 wherein the proximal end of each "E" bracket arm comprises a pivoting parallel bar linkage.

3. The mower of claim 2 wherein the mounting means comprise a plurality of pivot arms.

4. The mower of claim 3 further comprising a plurality of wheels, each wheel being mounted rollably upon one of the downwardly opening housings.

5. The mower of claim 1 wherein each rotary drive motor comprises an hydraulic motor.

6. The mower of claim 5 further comprising a plurality of power transmission assemblies, each power transmission assembly being adapted for communicating rotary power from one of the hydraulic motors to at least one of the horizontally orbiting blades and to at least one of the vertically orbiting blades.

7. The mower of claim 1 wherein each horizontally orbiting blade has a cutting edge and a trailing edge, said each blade's trailing edge being canted upwardly with respect to said each blade's cutting edge.

8. The mower of claim 7 wherein each blade among the plurality of horizontally orbiting blades is laterally paired with another blade among the plurality of horizontally orbiting blades, each lateral pair of horizontally orbiting blades residing within one of the downwardly opening housings.

9. A mower for attachment to an agricultural vehicle, the mower comprising:
(a) an "E" bracket, the "E" bracket comprising a column, a lower arm, an upper arm, and at least a first medial arm, wherein each of the "E" bracket's arms has a proximal end fixedly attached to the "E" bracket's column, and wherein each of the "E" bracket's arms is adapted for plant cutting and comprises a downwardly opening housing having a forward end;
(b) mounting means fixedly attached to the "E" bracket's column, said means being adapted for extending the "E" bracket from the agricultural vehicle; and
(c) a plurality of horizontally orbiting blades, each such blade having a cutting edge and an upwardly canted trailing edge, each such blade being mounted operatively within one of the downwardly opening housings; wherein each blade among the plurality of horizontally orbiting blades is laterally paired with another blade among the plurality of horizontally orbiting blades, each lateral pair of horizontally orbiting blades residing within one of the downwardly opening housings; wherein each downwardly opening housing has a lower flared section, and wherein each lateral pair of horizontally orbiting blades is positioned within one of said lower flared sections.

10. The mower of claim 9 further comprising a plurality of power transmission assemblies, each such assembly communicating power from one of the rotary drive motors to one of the lateral pairs of horizontally orbiting blades.

11. The mower of claim 10 wherein each power transmission assembly is adapted for counter-rotating one of the lateral pairs of horizontally orbiting blades.

12. The mower of claim 11 wherein each vertically orbiting blade is laterally paired with a plurality of vertically orbiting blades, said each blade and plurality of blades comprising pivoting hammer blades and forming a battery of mulching blades, and further comprising a lateral series of stationary cutting blades, said cutting blades being positioned for rotary passages of the pivoting hammer blades between said cutting blades.

13. The mower of claim 12 wherein each power transmission assembly is adapted for orbitally moving the blades of one of the batteries of mulching blades along a rearwardly traveling lower flight.

14. The mower of claim 13 wherein each downwardly opening housing comprises a rear ejection port.

15. The mower of claim 14 further comprising a plurality of tube fed spray nozzles, each nozzle among said plurality of nozzles being fixedly attached at the rearward end of one of the downwardly opening housings.

16. The mower of claim 15 wherein each tube fed spray nozzle is positioned forwardly from one of the downwardly opening housings' rear ejection ports, and further comprising a plurality of downwardly opening spray shrouds, each such shroud extending from one of the tube fed spray nozzles.

* * * * *